(No Model.)
R. L. KESTER.
FILTER.
No. 300,612. Patented June 17, 1884.
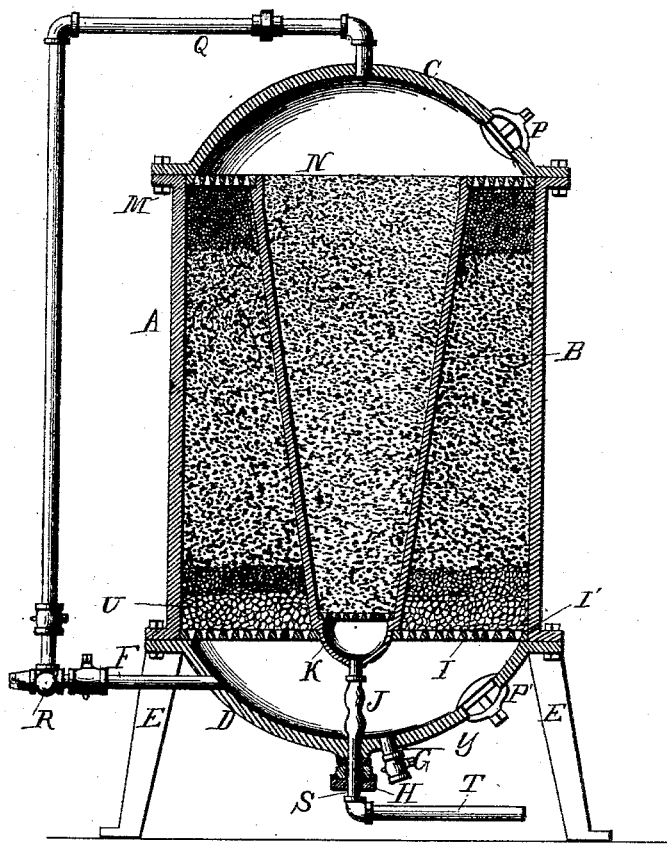
Witnesses:
John T. Morrow
Thos. Mungen
Inventor:
R. L. Kester
by Anderson & Smith
his Attorneys

UNITED STATES PATENT OFFICE.

ROBERT LIVINGSTON KESTER, OF PHILADELPHIA, PENNSYLVANIA.

FILTER.

SPECIFICATION forming part of Letters Patent No. 300,612, dated June 17, 1884.

Application filed November 3, 1883. (No model.)

*To all whom it may concern:*

Be it known that I, R. L. KESTER, a citizen of the United States, residing at Philadelphia, in the county of Philadelphia and State of Pennsylvania, have invented certain new and useful Improvements in Filters; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

The drawing is a representation of a vertical sectional view.

This invention has relation to water-filters; and it consists in the construction and novel arrangement of devices, as will be hereinafter fully described, and particularly pointed out in the claim appended.

Referring by letter to the accompanying drawing, A designates the outer casing of the duplex water-filter.

B indicates the inner tapering pot.

C designates the convex top, and D the concave bottom, both of which are smaller in diameter than the cylindrical outer casing, A. The cylinder may be mounted on either three or four legs, E, as may be desired.

F designates the inlet-pipe with a stop-cock, which enters at the bottom of the filter.

Y is a waste-pipe with stop-cock G near the middle of the bottom of the filter.

I designates a perforated plate, the edge of which rests on the shoulders I' of the concave bottom D.

K is a smaller perforated plate resting on a shoulder near the bottom of the tapering pot B.

H designates the stuffing-box at the water-joint leading from the filter.

J is a lead pipe connecting with the soldering-nipple at the bottom of the tapering pot.

M is a perforated plate having a central opening, N, of the same size as the mouth of the tapering pot. This perforated plate M covers the space between the mouth of the tapering pot and the inner wall of the outer casing.

P and P' are hand-holes.

Q represents the wash-out pipe leading from the supply-pipe R, and communicating with the filter through its convex top. This pipe is also provided with a stop-cock.

S designates a brass pipe which connects with the lead pipe, passes out through the stuffing-box at the bottom of the filter, and connects with the outlet-pipe T.

U designates the lower layer, which is of broken quartz and rests on the lower perforated plate. Upon this layer is a thinner layer of finer quartz, and above this and extending nearly to the top of the tapering pot is a layer of rotten-stone, and upon this is a finishing layer of fine or granulated quartz or sand. This last layer is covered by the upper perforated plate. The tapering pot is filled from its perforated bottom up with prepared charcoal. The water enters through the inlet-pipe at the bottom of the filter, and passes up through the filtering material, around the outside of the tapering pot, and then down through the charcoal and out through the outlet-pipe, thus filtering the water through two filters in its passage.

To wash the filters the stop-cock in the inlet-pipe is closed and the stop-cock in the wash-out pipe is opened, and the water passes through the outer filter from above downward and out at the waste-pipe.

Having thus fully described my invention, what I claim, and desire to secure by Letters Patent, is—

In a water-filter, the combination, with the outer casing having the convex top and concave bottom, the upper and lower plates, and the inlet-pipe, of the inner tapering pot having the perforated bottom plate and a connection at its lower end with the outlet-pipe and filtering material both within and around it, substantially as specified.

In testimony whereof I affix my signature in presence of two witnesses.

ROBERT LIVINGSTON KESTER.

Witnesses:
CHAS. BRISTLEY,
ALBERT H. LADNER.